Sept. 28, 1926.
G. J. ABBOTT
1,601,663
POWER TRANSMISSION MECHANISM
Filed Nov. 9, 1925
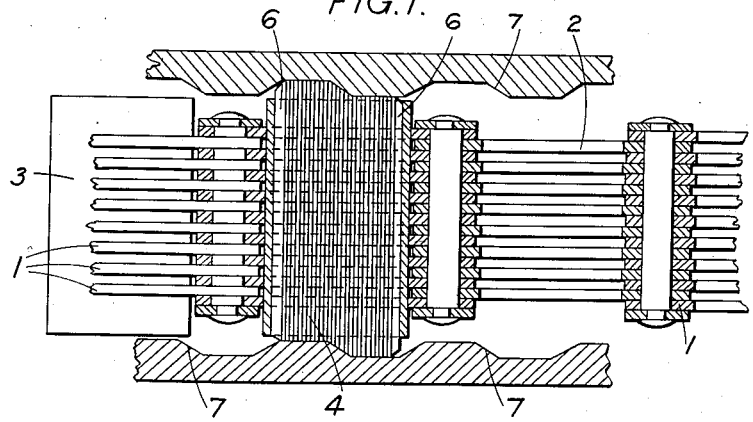
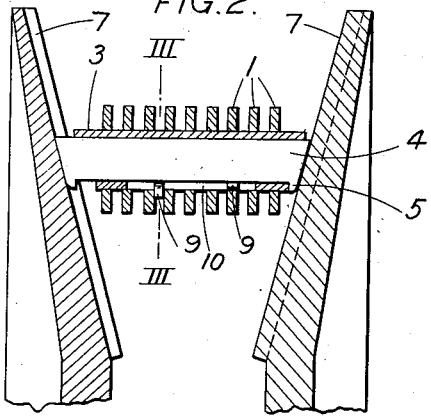
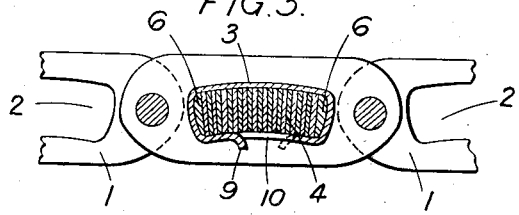
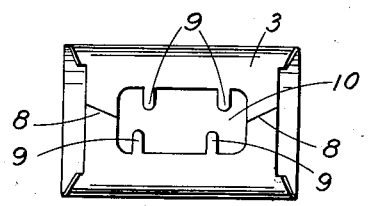
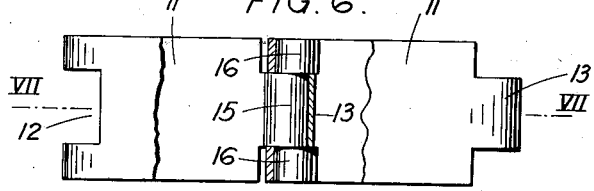
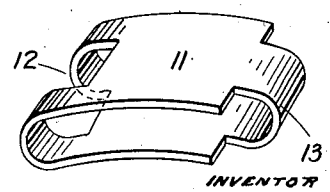
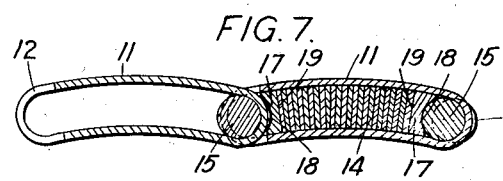
INVENTOR
G. J. Abbott
ATTYS Patented Sept. 28, 1926.

1,601,663

UNITED STATES PATENT OFFICE.

GEOFFREY JOSEPH ABBOTT, OF LONDON, ENGLAND.

POWER-TRANSMISSION MECHANISM.

Application filed November 9, 1925, Serial No. 67,971, and in Great Britain April 20, 1925.

This invention relates to power transmission mechanism, particularly applicable for use with expanding pulleys of the kind comprising a support in the form of a chain having slotted links each carrying a series of plates or like elements adapted to move transversely to the length of the chain so as to project laterally therefrom to form a series of compound teeth of variable pitch, width or contour.

To afford the maximum degree of support to the plates, the chain has hitherto been built up from a series of links of wedge-shaped cross section, each furnished with an arc-shaped slot through which the ends of the plates projected, and the object of this invention is to provide a chain which will be more efficient in operation and of cheaper construction.

According to this invention each group or pack of plates is carried by a sheath or casing which is substantially arc-shaped in side elevation, and preferably wedge-shaped in cross section, these sheaths being mounted within the links of a chain so as to extend across the width of the chain and project on either side thereof. Alternatively the sheaths may themselves constitute the links being pivotally connected together to form the chain. When separate links are used it is thus possible to build the chain proper from a series of simple parallel sided links or blocks, pivoted together in any known manner, these links or blocks being provided with slots into which the sheaths are inserted and secured in any suitable way.

Moreover, both the links and the sheaths can be formed from the material best suited to the work each has to perform, so that the sliding plates are provided with a housing of hardened material, within which they can slide across but not relatively to the length of the chain, while the links which carry the sheaths can be of some material, not so hardened, but adapted to withstand the stresses which arise in use. Further, when as is preferred, the sheaths are of wedge-shape in cross section, the plates are supported to within a short distance of their extreme ends, as in the case of the more complicated and expensive chain having its actual links of wedge-shaped cross section.

Two constructions of chain according to this invention are illustrated by way of example in the accompanying drawings, in which—

Figure 1 shows a development of a pulley and chain partly in section.

Figure 2 is a cross section through the pulley and chain shown in Figure 1.

Figure 3 is a sectional side elevation on the line III—III of Figure 2.

Figure 4 shows a sheath or liner in plan when viewed from below.

Figure 5 is a perspective view of a sheath which also forms a chain link.

Figure 6 is a plan, partly in section of two such links and their connecting pivot, and Figure 7 is a sectional side elevation on the line VII—VII of Figure 6.

In the chain illustrated in Figures 1–4, each complete link is composed of a number of flat plate-like elements 1 arranged parallel to one another and each provided with an arc-shaped slot 2. The individual plate-like link elements 1 are pivotally connected to the similar individual link elements of the next complete link, so as to form a series of spaced parallel plate-like elements as in the well known "Morse" type of chain, the number of link elements 1 to each complete link varying in accordance with the duty which a chain has to perform. Mounted within the arc-shaped slot or opening formed in each complete link is a sheath or casing 3 which is substantially wedge-shaped in cross section and arc-shaped in side elevation (see Figures 2 and 3 respectively). Each sheath serves to contain a group or pack of sliding plates 4 having a tooth or stop 5 projecting from the lower corner thereof which limit the lateral movement of the plates relatively to the sheath. In some cases the plates 4 may be provided with openings or perforations so as in effect to constitute a miniature girder-like structure.

The plates 4 can be inserted into or removed from the sheath without dismantling the chain by first removing the end members 6 of each group or pack of plates, these end members being of considerably greater thickness than the plates 4 themselves. If desired in some cases two or more of the plates in each group may have a stop 5 at one end only to facilitate this insertion or removal of the pack or individual plates in a pack.

The plates 4 are automatically set when they come into engagement with the ribs 7 of the pulley flanges (diagrammatically illustrated in Figures 1 and 2) and although in the example shown the number of plates carried by each complete link is such with relation to the width of the ribs and depressions in the pulley flanges that at least one compound tooth built up from a series of mutually supporting plates projects from each side of each group of plates, such an arrangement is not necessarily adopted in each case.

The sheaths 3 may be formed by cutting into suitable lengths a seamless tube of the required arc-shaped section, but preferably a metal blank is stamped out and bent into the form shown in Figure 4. The ends of the blank which eventually abut against one another are inclined, as at 8, so as not only to constitute an interlocking arrangement but also to prevent obstruction to the sliding movements of the plates. Further, lugs 9 are formed on the underside of the sheath which are then bent down as shown in Figures 2 and 3 so as to engage in the space between two parallel link elements 1 and thus prevent lateral displacement of the sheath relatively to the link in which it is supported. In addition, openings such as 10 are preferably formed in the underside of the sheath through which lubricant can be introduced into the sheath to ensure the free movement of the plates 4 therein.

In the alternative construction shown in Figures 5-7 instead of the sheaths being carried within slots in the link elements, the sheaths are cut from seamless tubing of the required arc-shaped cross section or are otherwise formed so as to provide link elements such as 11. Each such sheath link has a central opening 12 at one end and a correspondingly shaped projection 13 at the other formed by cutting away the central portion in the case of the gap 12 and the lateral portions of the sheath on either side of the central portion 13 respectively.

As before seen in cross section the sheaths 11 are preferably of wedge-shape in cross section so as to support the sliding plates 14—which are identical with the plates 4 already described—to within a short distance of their ends.

The chain is formed by connecting together a series of the sheaths 11 by means of pivots or rivets having their central portions 15 eccentric with their ends 16, so that the central portion 15 engages the projection 13 at the end of one sheath and the ends 16 engage the ends of the next link into the gap 12 of which the projection fits. In this construction the end members 17 of each group of plates 14 are of the cross-section shown in Figure 7 so that the curved surface 18 bears against the ends 16 of the rivets while the flat surface 19 bears against the face of the last plate 14 in each group.

Such a chain is suitable for relatively light work and possesses the advantages of the construction shown in Figures 1-4 since the plates 14 are provided with a wide sheath supporting them throughout the major portion of the length and adapted to retain a film of lubrication between the inner walls of the sheaths and the upper and lower edges of the sliding plates. Moreover this construction entails a minimum number of parts and can therefore be cheaply made and easily assembled.

What I claim as my invention and desire to secure by Letters Patent is:—

1. A power transmission chain comprising a number of sheaths arc-shaped in longitudinal section, a group of plates within each sheath mounted to slide therein across the length of the chain independently of one another so as to project laterally from either side thereof to form a series of driving teeth each consisting of at least two mutually supporting plates and a pivotal connection between each sheath.

2. In a power transmission chain the combination of a series of links each built up from a plurality of link elements having an arc-shaped slot and arranged parallel to one another of pivots connecting each set of link elements to those constituting the next complete link a sheath which is correspondingly arc-shaped in longitudinal section mounted in the arc-shaped slots within each complete link, and a group of plates mounted in each sheath so as to slide therein independently of one another across the length of the chain to form laterally projecting teeth of variable pitch each tooth being formed from a plurality of mutually supporting sliding plates.

3. In a power transmission chain the combination of a series of links each built up from a plurality of link elements having an arc-shaped slot and arranged parallel to one another of pivots connecting each set of link elements to those constituting the next complete link, a sheath which is correspondingly arc-shaped in longitudinal section mounted in the arc-shaped slots within each complete link, means for preventing lateral displacement of the sheaths relatively to their supporting links and a group of plates mounted in each sheath so as to slide therein independently of one another across the length of the chain to form laterally projecting teeth of variable pitch each tooth being formed from a plurality of mutually supporting sliding plates.

4. In a power transmission chain the combination of a series of links each built up from a plurality of link elements having an arc-shaped slot and arranged parallel to one another of pivots connecting each set of link elements to those constituting the next complete link, a sheath which is correspondingly arc-shaped in longitudinal section mounted in the arc-shaped slots within each complete link, a projection on each sheath adapted to engage the space between two parallel link elements and so prevent lateral displacement of the sheath relatively to such link elements, and a group of plates mounted in each sheath so as to slide therein independently of one another across the length of the chain to form laterally projecting teeth of variable pitch each tooth being formed from a plurality of mutually supporting sliding plates.

5. In a power transmission chain the combination of a series of links each built up from a plurality of link elements having an arc-shaped slot and arranged parallel to one another of pivots connecting each set of link elements to those constituting the next complete link, a sheath which is correspondingly arc-shaped in longitudinal section formed from a sheet metal blank mounted in the arc-shaped slots within each complete link, and a group of plates mounted in each sheath so as to slide therein independently of one another across the length of the chain to form laterally projecting teeth of variable pitch each tooth being formed from a plurality of mutually supporting sliding plates.

6. In a power transmission chain the combination of a series of links each built up from a plurality of link elements having an arc-shaped slot and arranged parallel to one another of pivots connecting each set of link elements to those constituting the next complete link, a sheath which is correspondingly arc-shaped in longitudinal section formed from a sheet metal blank mounted in the arc-shaped slots within each complete link, an integral projection on each sheath adapted to engage the space between two parallel link elements and so prevent lateral displacement of the sheath relatively to such link elements and a group of plates mounted in each sheath so as to slide therein independently of one another across the length of the chain to form laterally projecting teeth of variable pitch each tooth being formed from a plurality of mutually supporting sliding plates.

7. A power transmission chain comprising a number of sheaths arc-shaped in longitudinal section and wedge-shaped in cross section, a group of plates within each sheath mounted to slide therein across the length of the chain independently of one another so as to project laterally from either side thereof to form a series of driving teeth each consisting of at least two mutually supporting plates and a pivotal connection between each sheath.

8. In a power transmission chain the combination of a series of links each built up from a plurality of link elements having an arc-shaped slot and arranged parallel to one another of pivots connecting each set of link elements to those constituting the next complete link, a sheath which is correspondingly arc-shaped in longitudinal section and wedge-shaped in cross section mounted in the arc-shaped slots within each complete link, and a group of plates mounted in each sheath so as to slide therein independently of one another across the length of the chain to form laterally projecting teeth of variable pitch each tooth being formed from a plurality of mutually supporting sliding plates.

9. In a power transmission chain the combination of a series of links each built up from a plurality of plate-like link elements having an arc-shaped slot and arranged parallel to one another of pivots connecting each set of link elements with those constituting the next complete link, a sheath which is correspondingly arc-shaped in longitudinal section and wedge-shaped in cross section formed from a sheet metal blank mounted in the arc-shaped slots within each complete link, an integral projection on each link adapted to engage the space between two parallel link elements and so prevent lateral displacement of the sheath relatively to such link elements and a group of plates mounted to slide independently of one another within each sheath across the length of the chain to form laterally projecting teeth of variable pitch and contour, each tooth being built up from a plurality of mutually supporting sliding plates.

10. In a power transmission chain the combination of a series of links each built up from a plurality of plate-like link elements having an arc-shaped slot and arranged parallel to one another of pivots connecting each set of link elements with those constituting the next complete link, a sheath which is correspondingly arc-shaped in longitudinal section and wedge-shaped in cross section formed from a sheet metal blank having a central aperture and its abutting ends inclined mounted in the arc-shaped slots within each complete link, an integral projection on each link adapted to engage the space between two parallel link elements and so prevent lateral displacement of the sheath relatively to such link elements and a group of plates mounted to slide independently of one another within each sheath across the length of the chain to form laterally projecting teeth of variable pitch and contour, each tooth being built up from a plurality of mutually supporting sliding plates.

In testimony whereof I have signed my name to this specification.

GEOFFREY JOSEPH ABBOTT.